US011901633B2

(12) United States Patent
Cui et al.

(10) Patent No.: US 11,901,633 B2
(45) Date of Patent: Feb. 13, 2024

(54) ANTENNA AND ARRAY ANTENNA

(71) Applicant: Huawei Technologies Co., Ltd., Shenzhen (CN)

(72) Inventors: He Cui, Dongguan (CN); Weihong Xiao, Dongguan (CN); Guoqing Xie, Dongguan (CN); Yuequn Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 372 days.

(21) Appl. No.: 17/330,768

(22) Filed: May 26, 2021

(65) Prior Publication Data

US 2021/0280986 A1 Sep. 9, 2021

Related U.S. Application Data

(63) Continuation of application No. PCT/CN2019/120986, filed on Nov. 26, 2019.

(30) Foreign Application Priority Data

Nov. 27, 2018 (CN) ........................ 201811429274.7

(51) Int. Cl.
*H01Q 21/06* (2006.01)
*H01Q 5/20* (2015.01)
*H01Q 21/26* (2006.01)

(52) U.S. Cl.
CPC ............ *H01Q 21/062* (2013.01); *H01Q 5/20* (2015.01); *H01Q 21/26* (2013.01)

(58) Field of Classification Search
CPC ........ H01Q 21/062; H01Q 5/20; H01Q 21/26; H01Q 5/40; H01Q 21/08; H01Q 21/28;
(Continued)

(56) References Cited

U.S. PATENT DOCUMENTS 7,079,083 B2 * 7/2006 Gottl ...................... H01Q 21/29 343/810
8,593,365 B2 * 11/2013 Moon ...................... H01Q 9/16 343/816
(Continued)

FOREIGN PATENT DOCUMENTS

CN 101002361 A 7/2007
CN 101228665 A 7/2008
(Continued)

OTHER PUBLICATIONS

Zejiang, S. et al., "Radio navigation", Dalian Maritime University Press, Oct. 2017, 2 pages.

*Primary Examiner* — Seung H Lee
(74) *Attorney, Agent, or Firm* — SLATER MATSIL, LLP

(57) ABSTRACT

This application provides an antenna and an array antenna. The antenna in this application includes a first radiating element and a second radiating element, where four dipoles enclose to form the first radiating element, and the second radiating element is a radiating element disposed on an inner side of the first radiating element. The first radiating element is configured to support a transmit frequency band, and the second radiating element is configured to support a receive frequency band; or the first radiating element is configured to support a receive frequency band, and the second radiating element is configured to support a transmit frequency band.

17 Claims, 3 Drawing Sheets

(58) Field of Classification Search
CPC ............ H01Q 1/246; H01Q 1/36; H01Q 9/16; H01Q 21/06; H01Q 21/30
See application file for complete search history.

(56) References Cited

U.S. PATENT DOCUMENTS

| | | | | |
|---|---|---|---|---|
| 9,000,991 | B2 * | 4/2015 | Ramberg | ............. H01Q 13/085<br>343/793 |
| 2014/0012063 | A1 | 1/2014 | Turner et al. | |
| 2017/0271764 | A1 | 9/2017 | Gabriel et al. | |
| 2018/0097290 | A1 | 4/2018 | Matitsine et al. | |

FOREIGN PATENT DOCUMENTS

| | | | | |
|---|---|---|---|---|
| CN | 105552519 | A | 5/2016 | |
| CN | 104067442 | B | 8/2016 | |
| CN | 205543195 | U | 8/2016 | |
| CN | 106169644 | A | 11/2016 | |
| CN | 106229676 | A | 12/2016 | |
| CN | 106654557 | A | 5/2017 | |
| CN | 107359399 | A | 11/2017 | |
| CN | 107636892 | A | 1/2018 | |
| CN | 108352602 | A | 7/2018 | |
| DE | 102007060083 | A1 | 6/2009 | |
| EP | 2005522 | B1 | 9/2015 | |
| EP | 3739687 | A1 * | 11/2020 | ............... H01Q 1/24 |
| JP | 2018129604 | A | 8/2018 | |
| WO | 2017165512 | A1 | 9/2017 | |

* cited by examiner

ANTENNA AND ARRAY ANTENNA

CROSS-REFERENCE TO RELATED APPLICATIONS

This application is a continuation of International Application No. PCT/CN2019/120986, filed on Nov. 26, 2019, which claims priority to Chinese Patent Application No. 201811429274.7, filed on Nov. 27, 2018. The disclosures of the aforementioned applications are hereby incorporated by reference in their entireties.

TECHNICAL FIELD

This application relates to communications technologies, and in particular, to an antenna and an array antenna.

BACKGROUND

Through broadband design, a base station antenna can use one antenna to receive and transmit signals of different frequency bands. The signals of different frequency bands are separated by a filter or a combiner. If a spacing between two frequency bands is small, higher requirements are imposed on suppression of the filter or the combiner. Therefore, an independent antenna may be used for each frequency band, and a specific spacing is designed between antennas of different frequency bands, so as to reduce a suppression requirement on the filter or the combiner, and simplify design of the filter.

However, currently, in order to separate a transmit frequency band from a receive frequency band in an array antenna, an arrangement of generally designed antenna units is complex, which leads to great difficulty in designing a feeding network.

SUMMARY

This application provides an antenna and an array antenna, and a transmit path and a receive path are physically separated by using a simplified feeding network design.

According to a first aspect, this application provides an antenna, including a first radiating element and a second radiating element, where four dipoles enclose to form the first radiating element, and the second radiating element is a radiating element disposed on an inner side of the first radiating element. The first radiating element is configured to support a transmit frequency band, and the second radiating element is configured to support a receive frequency band; or the first radiating element is configured to support a receive frequency band, and the second radiating element is configured to support a transmit frequency band.

In this application, a transmit path and a receive path of the antenna are physically separated by using a simplified feeding network design without increasing an antenna size.

In a possible implementation, the antenna further includes a third radiating element, where the third radiating element is a radiating element disposed on an outer side of the first radiating element. The first radiating element is configured to support a first transmit frequency band and a second transmit frequency band, and the second radiating element and the third radiating element each are configured to support either of a first receive frequency band and a second receive frequency band; or the first radiating element is configured to support a first receive frequency band and a second receive frequency band, and the second radiating element and the third radiating element each are configured to support either of a first transmit frequency band and a second transmit frequency band, where the second radiating element and the third radiating element support different frequency bands.

In a possible implementation, the first radiating element, the second radiating element, and the third radiating element are all dielectric elements.

In a possible implementation, the transmit frequency band is 1805-1880 MHz, and the receive frequency band is 1710-1785 MHz.

In a possible implementation, the first transmit frequency band is 1805-1880 MHz, the second transmit frequency band is 2110-2170 MHz, the first receive frequency band is 1710-1785 MHz, and the second receive frequency band is 1920-1980 MHz.

According to a second aspect, this application provides an array antenna, including a plurality of antennas, where the antennas are the antennas according to any one of claims 1 to 6, and the plurality of antennas are arranged according to a preset deployment scheme.

In a possible implementation, the plurality of antennas are arranged into a row or a column of to form a linear array.

In a possible implementation, the plurality of antennas are arranged into square arrays.

In a possible implementation, a range of a distance between two adjacent first radiating elements is 0.4λ to 0.6λ, and λ represents a wavelength corresponding to a frequency band supported by the first radiating elements.

In this application, a transmit path and a receive path of the array antenna are physically separated by using a simplified feeding network design without increasing an antenna size.

DETAILED DESCRIPTION OF ILLUSTRATIVE EMBODIMENTS

To make the objectives, technical solutions, and advantages of this application clearer, the following describes the technical solutions in this application with reference to the accompanying drawings in this application. It is clear that the described embodiments are merely a part rather than all of embodiments of this application. All other embodiments obtained by persons of ordinary skill in the art based on the embodiments of this application without creative efforts shall fall within the protection scope of this application.

In the embodiments, claims, and accompanying drawings of this application, the terms "first", "second", and the like are merely used for distinction and description, and shall not be understood as an indication or implication of relative importance or an indication or implication of an order. In addition, terms "include", "comprise", and any other variant thereof are intended to cover non-exclusive inclusion, for example, a process, method, system, product, or device that includes a list of steps or units is not necessarily limited to those steps or units, but may include other steps or units that are not clearly listed or inherent to such a process, method, product, or device.

It should be understood that, in this application, "at least one" means one or more, and "a plurality of" means two or more. The term "and/or" is used to describe an association relationship for describing associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

Figure 1A:
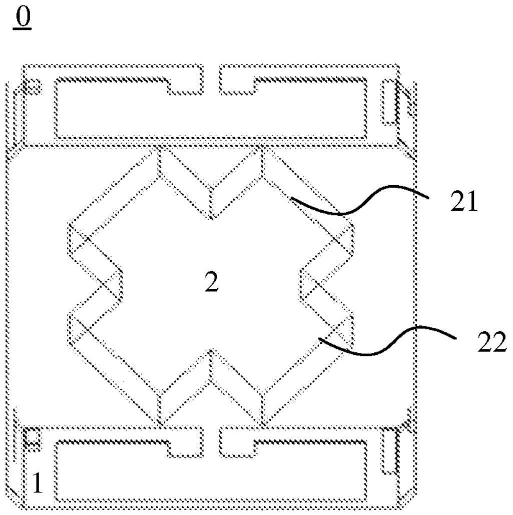
FIG. 1A and FIG. 1B are schematic structural diagrams of Embodiment 1 of an antenna according to this application.
Figure 1B:
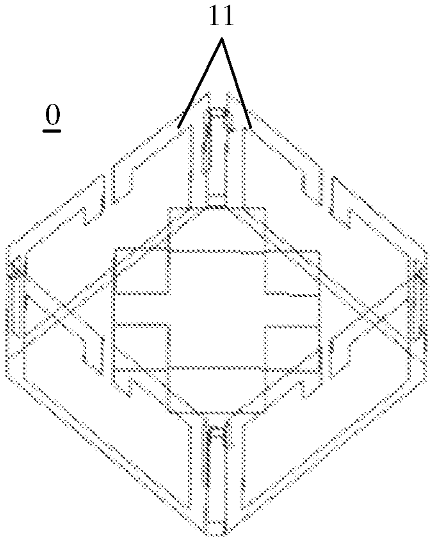

FIG. 1A and FIG. 1B are schematic structural diagrams of Embodiment 1 of an antenna according to this application. With reference to FIG. 1A and FIG. 1B, an antenna 0 in this embodiment may include a first radiating element 1 and a second radiating element 2, and four dipoles 11 enclose to form the first radiating element 1. For example, an appearance of the first radiating element 1 formed by the four dipoles 11 is similar to a square box. For another example, an appearance of the first radiating element 1 formed by the four dipoles 11 is similar to an appearance of a circular "bowl". The second radiating element 2 is a radiating element disposed on an inner side of the first radiating element 1. To be specific, the second radiating element 2 is suspended on the inner side of the square box of the first radiating element 1, and is not in contact with the bottom and a side wall of the first radiating element 1 in all directions. The second radiating element 2 is not electrically connected to the first radiating element 1. That is, the second radiating element 2 is neither directly electrically connected to the first radiating element 1 nor electrically coupled to the first radiating element 1. The second radiating element 2 includes a first dipole 21 and a second dipole 22 in two different polarization directions. The first radiating element 1 and the second radiating element 2 may be connected to an antenna tray through respective ports. The tray may also be referred to as a reflector. Based on this, a +/−45-degree dual-polarized antenna is formed. The first radiating element 1 is configured to support a transmit frequency band, and the second radiating element 2 is configured to support a receive frequency band; or the first radiating element 1 is configured to support a receive frequency band, and the second radiating element 2 is configured to support a transmit frequency band.

In this application, a transmit path and a receive path of the antenna are physically separated, and the first radiating element and the second radiating element support different frequency bands. A universal mobile telecommunications system (UMTS) is used as an example. 1805-1880 MHz is the transmit frequency band, and 1710-1785 MHz is the receive frequency band. If the first radiating element supports the transmit frequency band 1805-1880 MHz, the second radiating element supports the receive frequency band 1710-1785 MHz. On the contrary, if the first radiating element supports the receive frequency band 1710-1785 MHz, the second radiating element supports the transmit frequency band 1805-1880 MHz. It should be noted that the transmit frequency band and the receive frequency band in this application may alternatively be a combination of other frequency bands. This is not limited.

In this application, the transmit path and the receive path of the antenna are physically separated by using a simplified feeding network design without increasing an antenna size.

Figure 2:
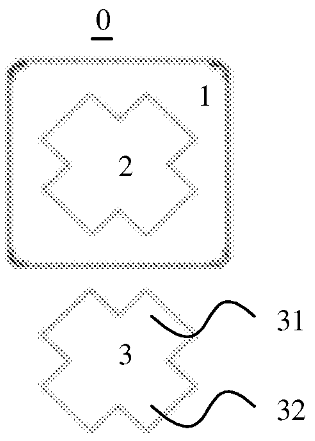
FIG. 2 is a schematic structural diagram of Embodiment 2 of an antenna according to this application.

Based on the foregoing technical solution, FIG. 2 is a schematic structural diagram of Embodiment 2 of an antenna according to this application. As shown in FIG. 2, the antenna 0 in this embodiment may further include a third radiating element 3, where the third radiating element 3 includes a third dipole 31 and a fourth dipole 32 in two different polarization directions. The third radiating element 3 is disposed on an outer side of the first radiating element 1, and may be disposed on a lower left side, a right bottom side, or the like of the first radiating element 1. This is not specifically limited. The first radiating element 1 is configured to support a first transmit frequency band and a second transmit frequency band, and the second radiating element 2 and the third radiating element 3 each are configured to support either of a first receive frequency band and a second receive frequency band; or the first radiating element 1 is configured to support the first receive frequency band and the second receive frequency band, and the second radiating element 2 and the third radiating element 3 each are configured to support either of a first transmit frequency band and a second transmit frequency band, where the second radiating element 2 and the third radiating element 3 support different frequency bands.

In this application, areas of the first radiating element, the second radiating element, and the third radiating element are separated. The first radiating element is used as a transmit antenna, and the second radiating element and the third radiating element are used as receive antennas. For example, the first radiating element supports both transmit frequency bands 1805-1880 MHz and 2110-2170 MHz, and the second radiating element and the third radiating element may each select to support either of receive frequency bands 1710-1785 MHz and 1920-1980 MHz; or the first radiating element supports both receive frequency bands 1710-1785 MHz and 1920-1980 MHz, and the second radiating element and the third radiating element may each select to support either of transmit frequency bands 1805-1880 MHz and 2110-2170 MHz. It should be noted that the transmit frequency bands and the receive frequency bands in this application may alternatively be a combination of other frequency bands. This is not limited.

In this application, a transmit path and a receive path of the antenna are physically separated by using a simplified feeding network design without increasing an antenna size.

Figure 3:
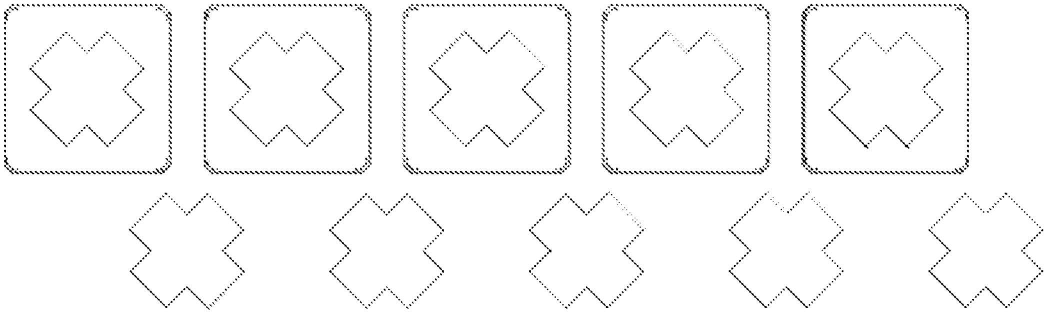
FIG. 3 is a schematic structural diagram of Embodiment 1 of an array antenna according to this application.
Figure 4:
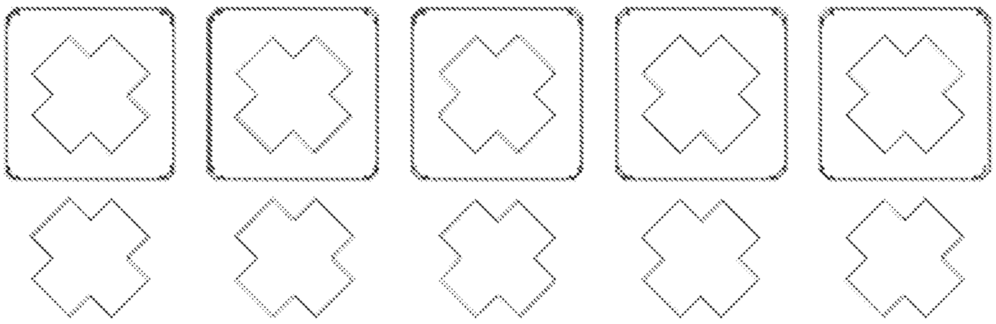
FIG. 4 is a schematic structural diagram of Embodiment 2 of an array antenna according to this application.
Figure 5:
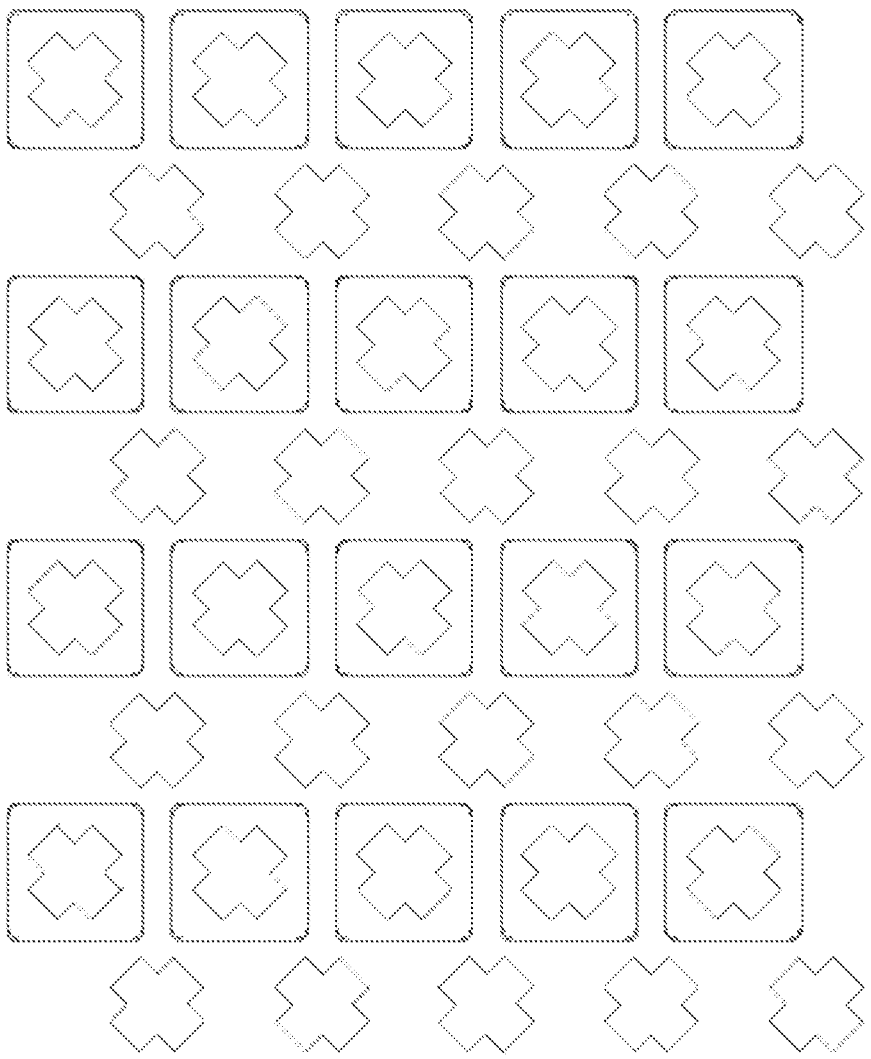
FIG. 5 is a schematic structural diagram of Embodiment 3 of an array antenna according to this application.

FIG. 3 is a schematic structural diagram of Embodiment 1 of an array antenna according to this application. FIG. 4 is a schematic structural diagram of Embodiment 2 of an array antenna according to this application. FIG. 5 is a schematic structural diagram of Embodiment 3 of an array antenna according to this application. With reference to FIG. 3 to FIG. 5, the array antenna in this embodiment may include a plurality of antennas 0 arranged according to a preset deployment scheme, where the antennas 0 are the antennas shown in FIG. 1 or FIG. 2. The plurality of antennas 0 may be arranged into a row or a column to form a linear array, or may be arranged into square arrays. A range of a distance between two adjacent first radiating elements 1 is 0.4λ to 0.6λ, where λ represents a wavelength corresponding to a frequency band supported by the first radiating elements 1. Preferably, the distance between the two adjacent first radiating elements 1 is 0.5λ. A third radiating element 7 may be disposed below the first radiating elements 1, and located at a position between the two first radiating elements 1; or the third radiating element 7 may be disposed below the first radiating elements 1, and located at a position right below a second radiating element 2.

In this application, a transmit path and a receive path of the array antenna are physically separated by using a simplified feeding network design without increasing an antenna size.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An antenna, comprising:

a first radiating element; and a second radiating element, wherein:

the first radiating element comprises four dipoles enclosing the second radiating element in a plan view, and the second radiating element is disposed on an inner side of the first radiating element, and wherein:

the first radiating element is configured to support a transmit frequency band, and the second radiating element is configured to support a receive frequency band, or the first radiating element is configured to support the receive frequency band, and the second radiating element is configured to support the transmit frequency band; and a third radiating element disposed on an outer side of the first radiating element, wherein:

the first radiating element is configured to support a first transmit frequency band and a second transmit frequency band, the second radiating element and the third radiating element each are configured to support either of a first receive frequency band or a second receive frequency band, and the second radiating element and the third radiating element support different frequency bands.

2. The antenna according to claim 1, wherein the first transmit frequency band is 1805-1880 MHz, the second transmit frequency band is 2110-2170 MHz, the first receive frequency band is 1710-1785 MHz, and the second receive frequency band is 1920-1980 MHz.

3. The antenna according to claim 1, wherein the first radiating element is further configured to support a first receive frequency band and a second receive frequency band, and the second radiating element and the third radiating element each are further configured to support either of a first transmit frequency band or a second transmit frequency band.

4. The antenna according to claim 3, wherein the first transmit frequency band is 1805-1880 MHz, the second transmit frequency band is 2110-2170 MHz, the first receive frequency band is 1710-1785 MHz, and the second receive frequency band is 1920-1980 MHz.

5. The antenna according to claim 1, wherein the transmit frequency band is 1805-1880 MHz, and the receive frequency band is 1710-1785 MHz.

6. The antenna according to claim 1, wherein the first radiating element is configured to support the transmit frequency band, and the second radiating element is configured to support the receive frequency band.

7. The antenna according to claim 1, wherein the first radiating element is configured to support the receive frequency band, and the second radiating element is configured to support the transmit frequency band.

8. An array antenna, comprising a plurality of antennas, wherein each antenna of the plurality of antennas respectively comprises:

a first radiating element; and a second radiating element, wherein:

the first radiating element comprises four dipoles enclosing the second radiating element in a plan view, and the second radiating element is disposed on an inner side of the first radiating element; and wherein, for each antenna of the plurality of antennas:

the first radiating element of the respective antenna is configured to support a transmit frequency band, and the second radiating element of the respective antenna is configured to support a receive frequency band, or the first radiating element of the respective antenna is configured to support the receive frequency band, and the second radiating element of the respective antenna is configured to support the transmit frequency band; and a third radiating element, wherein each third radiating element is disposed on an outer side of the respective corresponding first radiating element, wherein:

each first radiating element is configured to support a first transmit frequency band and a second transmit frequency band, each second radiating element and each third radiating element are configured to support either of a first receive frequency band or a second receive frequency band, and the second radiating elements and the third radiating elements support different frequency bands.

9. The array antenna according to claim 8, wherein antennas of the plurality of antennas are arranged into a row or a column to form a linear array.

10. The array antenna according to claim 8, wherein antennas of the plurality of antennas are arranged into square arrays.

11. The array antenna according to claim 8, wherein a range of a distance between two adjacent first radiating elements is 0.4λ to 0.6λ, and λ represents a wavelength corresponding to a frequency band supported by the first radiating elements.

12. The array antenna according to claim 8, wherein antennas of the plurality of antennas are arranged according to a preset deployment scheme.

13. The array antenna according to claim 8, wherein the first transmit frequency band is 1805-1880 MHz, the second transmit frequency band is 2110-2170 MHz, the first receive frequency band is 1710-1785 MHz, and the second receive frequency band is 1920-1980 MHz.

14. The array antenna according to claim 8, wherein each first radiating element is configured to support a first receive frequency band and a second receive frequency band, and each second radiating element and each third radiating element are configured to support either of a first transmit frequency band or a second transmit frequency band.

15. The array antenna according to claim 14, wherein the first transmit frequency band is 1805-1880 MHz, the second transmit frequency band is 2110-2170 MHz, the first receive frequency band is 1710-1785 MHz, and the second receive frequency band is 1920-1980 MHz.

16. The array antenna according to claim 8, wherein the transmit frequency band is 1805-1880 MHz, and the receive frequency band is 1710-1785 MHz.

17. The array antenna according to claim 8, wherein each first radiating element is configured to support the transmit frequency band, and each second radiating element is configured to support the receive frequency band.

* * * * *